US008483939B2

(12) United States Patent
Wu (10) Patent No.: US 8,483,939 B2
(45) Date of Patent: Jul. 9, 2013

(54) VEHICLE-DISPATCHING METHOD, VEHICLE-DISPATCHING SYSTEM AND NAVIGATING DEVICE USED IN THE SAME

(75) Inventor: Jason Wu, Taipei (TW)

(73) Assignee: Taiwan Mobile Communication, Taipei (TW)

( * ) Notice: Subject to any disclaimer, the term of this patent is extended or adjusted under 35 U.S.C. 154(b) by 347 days.

(21) Appl. No.: 12/652,593

(22) Filed: Jan. 5, 2010

(65) Prior Publication Data

US 2010/0241349 A1 Sep. 23, 2010

(30) Foreign Application Priority Data

Mar. 20, 2009 (TW) .............................. 98109156 A (51) Int. Cl.
*G01C 21/34* (2006.01)
*G01C 21/36* (2006.01)
(52) U.S. Cl.
USPC ............................ 701/117; 701/532; 701/533
(58) Field of Classification Search
USPC ................ 701/117, 338, 532, 533, 201, 438, 701/537, 538; 705/7.13, 7.36; 340/993; 455/414.2, 456.2
See application file for complete search history.

(56) References Cited

U.S. PATENT DOCUMENTS

| | | | | |
|---|---|---|---|---|
| 5,636,122 A | * | 6/1997 | Shah et al. | 701/454 |
| 5,945,919 A | * | 8/1999 | Trask | 340/8.1 |
| 6,026,345 A | * | 2/2000 | Shah et al. | 701/117 |
| 6,088,648 A | * | 7/2000 | Shah et al. | 701/117 |
| 6,456,207 B1 | * | 9/2002 | Yen | 340/994 |
| 6,711,500 B2 | * | 3/2004 | Chen | 701/482 |
| 6,756,913 B1 | * | 6/2004 | Ayed | 340/992 |
| 6,832,092 B1 | * | 12/2004 | Suarez et al. | 455/456.1 |
| 7,263,437 B2 | * | 8/2007 | Hirose et al. | 701/517 |
| 8,005,488 B2 | * | 8/2011 | Staffaroni et al. | 455/456.2 |
| 2001/0029429 A1 | * | 10/2001 | Katayama et al. | 701/209 |
| 2002/0188702 A1 | * | 12/2002 | Short et al. | 709/220 |

(Continued)

FOREIGN PATENT DOCUMENTS

| | | |
|---|---|---|
| JP | 2002140795 A | 2/2002 |
| TW | M346082 U | 12/2008 |

OTHER PUBLICATIONS

Integrated Definition, at Dictionary.com, available at http://dictionary.reference.com/browse/integrated?r=66 (last visited Mar. 13, 2012).*

(Continued)

*Primary Examiner* — Joseph Rocca
(74) *Attorney, Agent, or Firm* — Kirton McConkie; Evan R. Witt (57) ABSTRACT

A vehicle-dispatching system includes a service center and a plurality of hosts disposed in respective vehicles, and one of the vehicles is selected for dispatching when the service center receives a vehicle request from a passenger. For facilitating drivers to decide whether to accept the task, a message including location information of the passenger is sent to dispatching units of the hosts by the service center to trigger navigating units of the hosts to reveal respective route information for the drivers' reference. Once one or more drivers decide to accept the task, they may trigger the dispatching units to issue respective task-accepting signals to the service center. The service driver then selects one of the vehicles for dispatching by sending a dispatching signal to the dispatching unit of the selected vehicle. The dispatching signal then triggers the navigating unit of the selected vehicle to automatically reveal navigating information.

19 Claims, 5 Drawing Sheets

U.S. PATENT DOCUMENTS

| | | | |
|---|---|---|---|
| 2003/0054837 A1* | 3/2003 | Ennis | 455/456 |
| 2004/0030493 A1* | 2/2004 | Pechatnikov et al. | 701/208 |
| 2004/0106399 A1* | 6/2004 | Ki | 455/422.1 |
| 2007/0073552 A1* | 3/2007 | Hileman | 705/1 |
| 2007/0207842 A1* | 9/2007 | Pemble et al. | 455/575.9 |
| 2008/0015923 A1* | 1/2008 | Masaba | 705/9 |
| 2009/0143965 A1* | 6/2009 | Chang et al. | 701/117 |
| 2009/0210140 A1* | 8/2009 | Short et al. | 701/117 |
| 2009/0287527 A1* | 11/2009 | Kolb et al. | 705/9 |
| 2009/0327011 A1* | 12/2009 | Petroff | 705/8 |
| 2010/0241349 A1* | 9/2010 | Wu | 701/201 |
| 2010/0293030 A1* | 11/2010 | Wu | 705/9 |
| 2010/0312591 A1* | 12/2010 | Wu | 705/7 |

OTHER PUBLICATIONS

"Reveal" Definition, available at http://www.merriam-webster.com/dictionary/reveal (last visited Jun. 19, 2012).*

"Generate" Definition, available at http://www.merriam-webster.com/dictionary/generate (last visited Jun. 19, 2012).*

The Planning, Development and Application Demonstration of the Core Modules for Intelligent Taxi Security Management and Dispatching System (First Phase), Jul. 2003.

Serial ITS/CVO Developing Plan—The Planning, Development and Application Demonstration of the Core Modules for Intelligent Taxi Operation Security Management and Dispatching System (Phase III), May 2005.

* cited by examiner

VEHICLE-DISPATCHING METHOD, VEHICLE-DISPATCHING SYSTEM AND NAVIGATING DEVICE USED IN THE SAME

FIELD OF THE INVENTION

The present invention relates to a vehicle-dispatching method, a vehicle-dispatching system, and a navigating device for use with the method and the system, and more particularly to a vehicle-dispatching method, a vehicle-dispatching system, and a navigating device for use with the method and the system for dispatching taxis.

BACKGROUND OF THE INVENTION

In busy metropolis, one of the most popular transportation tools is a taxi, which is advantageous in providing door-to-door service. To dispatch a taxi to a passenger dynamically but readily, a current practice is that a vehicle-dispatching center inquires the task-taking wills of all the taxi drivers belonging to the same network by wireless communication when receiving a taxi call message from a passenger through a phone call or online request. Then one of the responsive taxis is selected to pick up the passenger based on different coordinating conditions stipulated by different vehicle-dispatching companies. Nevertheless, there is still a need of a more rapid, effective and convenient way to accomplish the above-mentioned or improved dispatching procedure.

SUMMARY OF THE INVENTION

Therefore, the present invention provides a vehicle-dispatching method and a vehicle-dispatching system to execute vehicle dispatching with minimized manual operations of the driver. The present invention also provides a navigating device for use with such a vehicle-dispatching method and in a vehicle-dispatching system.

In accordance with a first aspect of the present invention, a vehicle-dispatching method is used with a service center and at least one vehicle. The method includes steps of: issuing a message including a location information of a passenger to the host of the vehicle by the service center; revealing a route information associated with the location information and a current position of the vehicle by the host of the vehicle in response to the message; optionally issuing a task-accepting signal to the service center by the host to respond to the message; sending a dispatching signal to the host of the vehicle by the service center if the vehicle issues the task-accepting signal and is selected for dispatching by the service center; and triggering the host to automatically reveal a navigating information associated with the location information by the dispatching signal.

In accordance with a second aspect of the present invention, a vehicle-dispatching system includes a service center issuing a message including a location information of a passenger when receiving a vehicle request from the passenger; and a plurality of hosts disposed in respective vehicles in communication with the service center, and revealing route information associated with the location information and current positions of the vehicles in response to the message, each of the hosts being optionally and manually triggered to send a task-accepting signal to the service center and selectively receive a dispatching signal from the service center to automatically reveal a navigating information associated with the location information.

In accordance with a third aspect of the present invention, a navigating device is used in a vehicle to communicate with a service center, and includes a dispatching unit decoding a location information of a passenger included in a message issued by the service center when the passenger sends a vehicle request to the service center, sending a task-accepting signal to the service center in response to the triggering by a driver of the vehicle, and receiving a dispatching signal from the service center when the vehicle is selected for dispatching by the service center; and a navigating unit in communication with the dispatching unit, receiving the location information from the dispatching unit and automatically revealing a route information associated with the location information and a current position of the vehicle in response to the message, and automatically revealing a navigating information including navigation from the current position of the vehicle to a pick-up location in response to the dispatching signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Because of the prevalence of navigating devices, taxis disposed with global positioning system (GPS) devices for satellite positioning have prevailed considerably. In a general use of a GPS device, a driver often needs to key in the navigating information manually while driving. Particularly for a taxi driver who is almost always on the road, it is inconvenient to operate and dangerous for driving. Besides, currently existing navigating devices used in taxis generally stand alone from the vehicle-dispatching system. Therefore, the present invention provides a navigating device integrated with a vehicle-dispatching system to facilitate the work of the taxi drivers.

Figure 1:
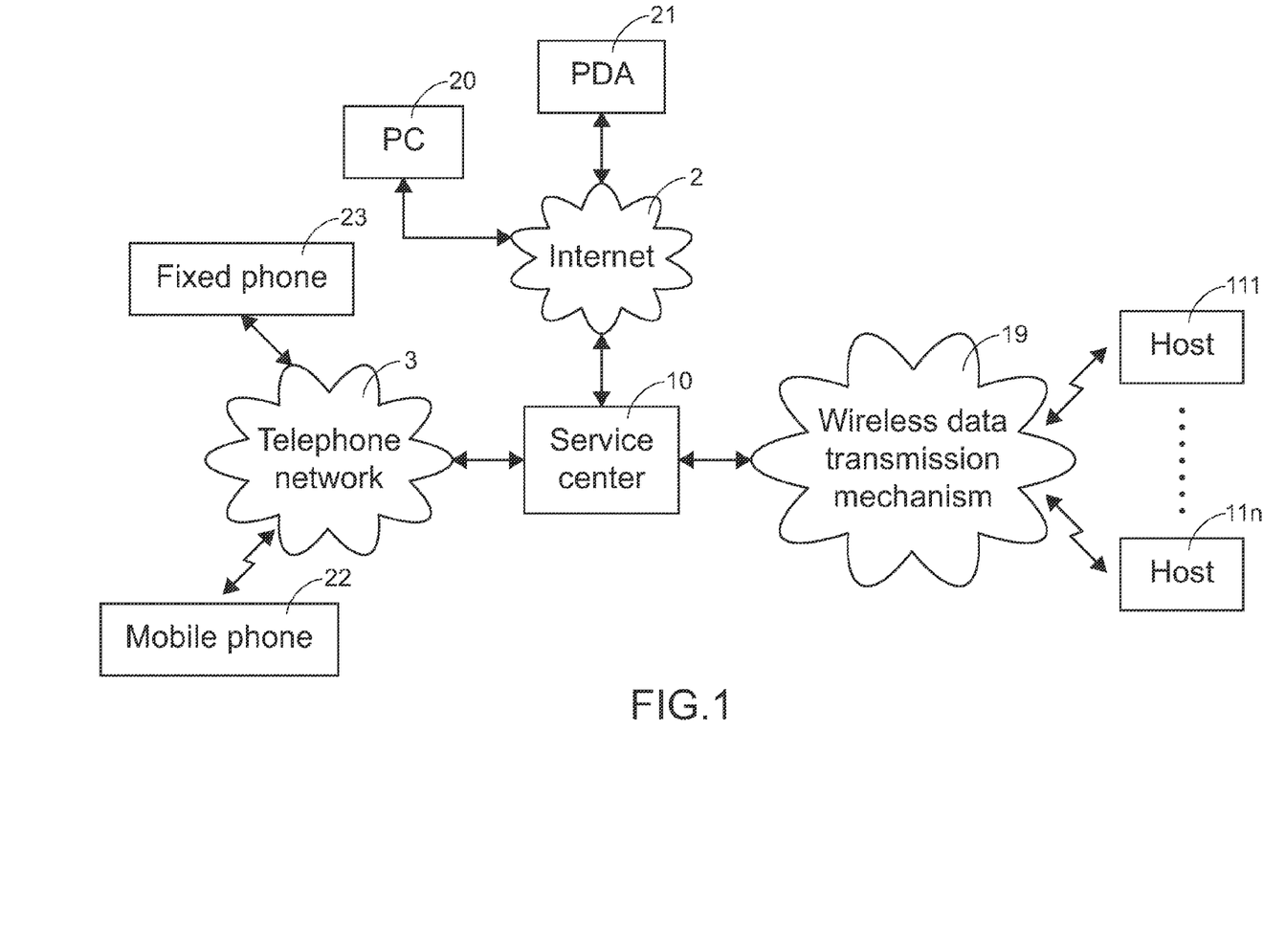
FIG. 1 is a functional block diagram illustrating a vehicle-dispatching system according to an embodiment of the present invention.

Please refer to FIG. 1, which is a functional block diagram illustrating a vehicle-dispatching system according to an embodiment of the present invention. The system comprises a service center 10 for receiving and issuing a variety of information and a plurality of hosts 111~11n in communication with the service center 10. As illustrated in FIG. 1, the service center 10 is connected to the Internet 2 and a telephone network 3. The service center 10 may receive a vehicle-request phone call through the telephone network 3 or a vehicle online request through the Internet 2 from a customer using, for example, a personal computer 20, a personal digital assistant (PDA) 21, a mobile phone 22 or a fixed phone 23.

The vehicle request may be directly entered through a telephonic audio system of the service center 10 or conveyed to service personnel in the service center 10. Alternatively, the vehicle request may also be a text or voice message entered through the personal computer 20, the PDA 21, the mobile phone 22 or the fixed phone 23. Generally, the information entered by the customer includes, for example, the pick-up location and/or the drop-off destination.

The hosts 111~11n are disposed in respective taxis, and are all communicable with the service center 10 through a wireless data transmission mechanism 19. For example, a host may transmit data to the service center 10 through general packet radio service (GPRS) of a mobile phone network. Of course, the emerging third generation (3G) mobile phone network, worldwide interoperability for microwave access (WiMax), Wi-Fi or other wireless networks may be other options of wireless data transmission mechanisms. For readily exchanging information of locations, each host exhibits a function of positioning. For example, it may include functions of a GPS device for receiving satellite positioning signals, or a mobile positioning service provided by a mobile phone or wireless network base station. In addition, the host is preferably capable of sending a message of occupancy status, i.e. whether the taxi is vacant or not, to the service center 10 through the above-mentioned wireless data transmission mechanism 19, so as to facilitate the service center 10 to manage the taxis.

According to the information acquired from the customer and the information received from the hosts, the service center 10 searches automatically one or more taxis available for dispatching in vicinity of the customer.

Figure 2:
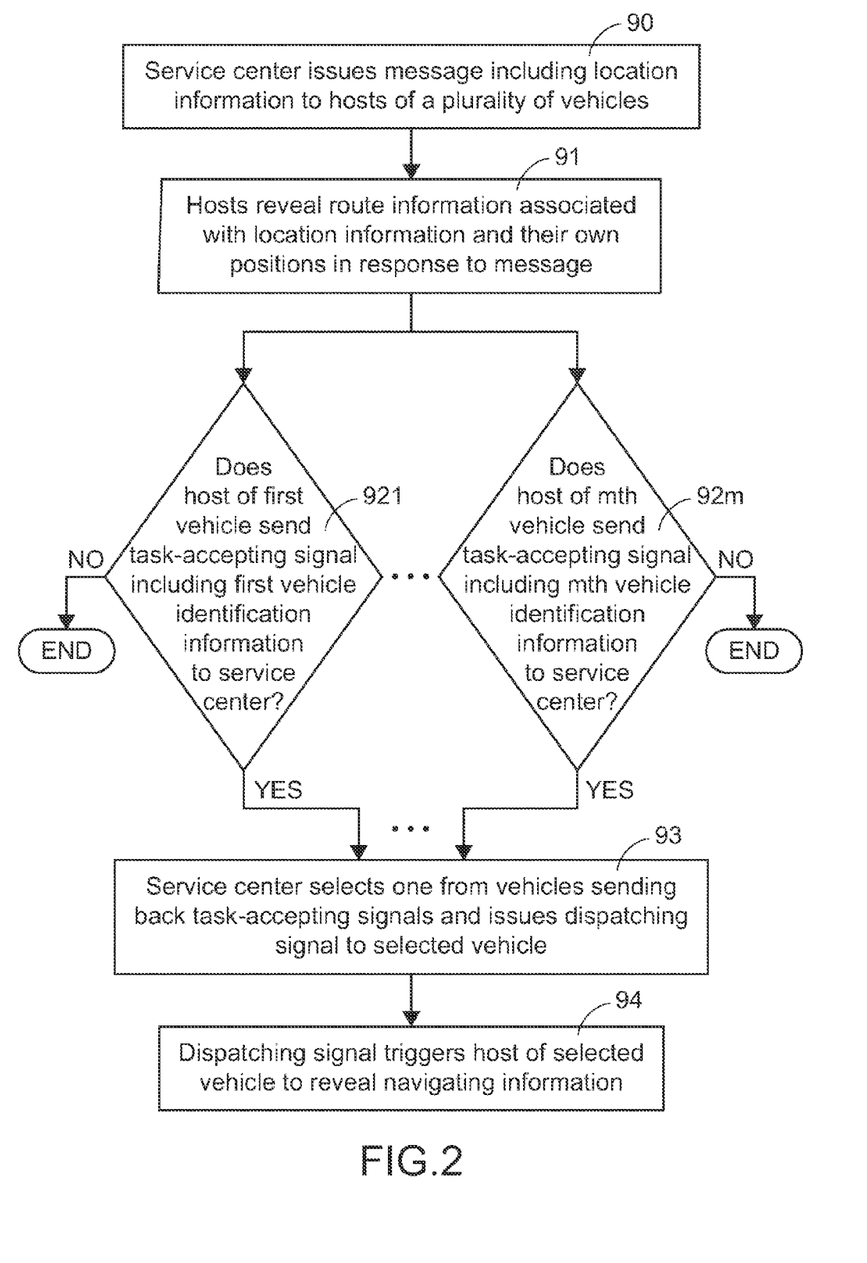
FIG. 2 is a flowchart illustrating a vehicle-dispatching method according to an embodiment of the present invention.

Please refer to FIG. 2, which is a flowchart illustrating a vehicle-dispatching method according to an embodiment of the present invention. After receiving a vehicle request from a customer, the service center issues a message associated with the location information included in the vehicle request, e.g. pick-up location and/or the drop-off destination, to a plurality of hosts (Step 90). Each host, in response to the message, automatically reveals route information associated with the location information and the current position of the vehicle (Step 91). The drivers may refer to the route information to decide whether to accept the task or not. Those who are willing to accept the task then trigger the hosts to send a task-accepting signal along with vehicle identification information (e.g. a registration number of the vehicle) back to the service center (Step 921~92m). The service center then selects one of the vehicles which send back the task-accepting signals, and issues a dispatching signal to the host of the selected vehicle (Step 93). In response to the dispatching signal, the host automatically reveals navigating information for the reference of the vehicle driver (Step 94).

Figure 3:
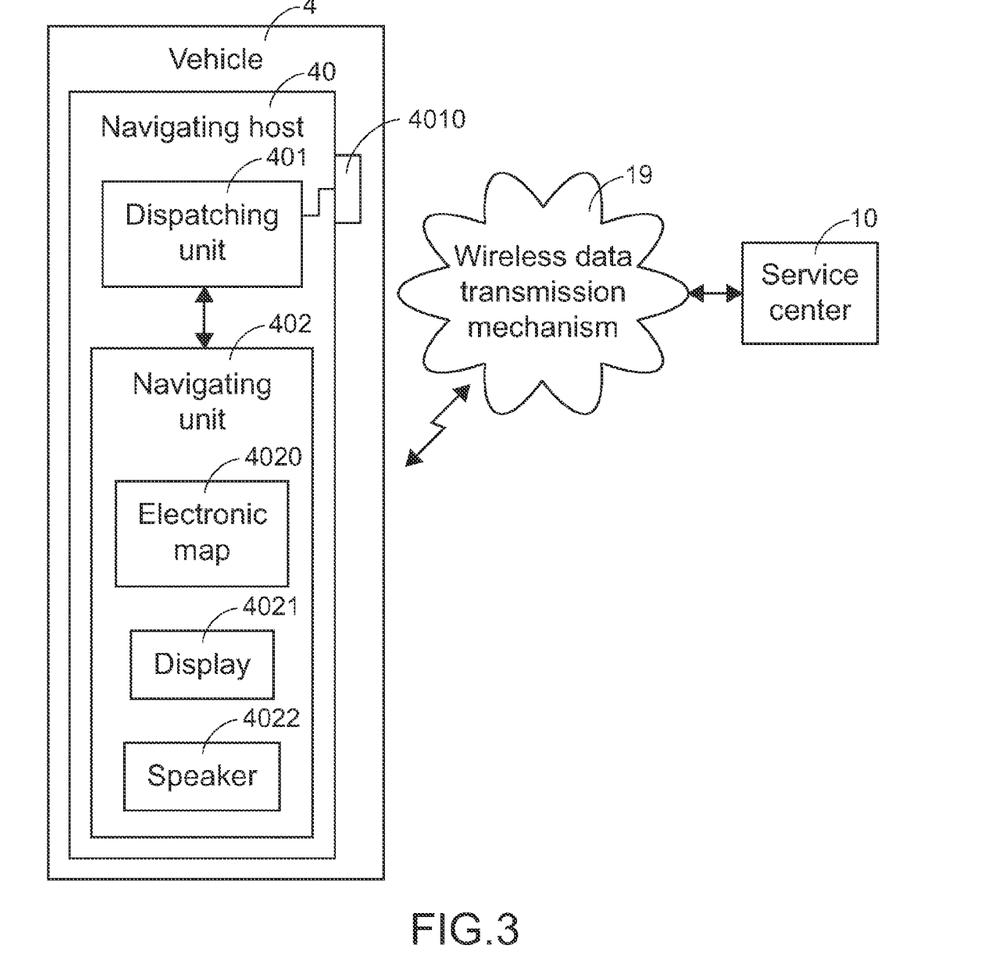
FIG. 3 is a functional block diagram illustrating a navigating device in communication with a service center according to an embodiment of the present invention.

Please further refer to FIG. 3, which is a functional block diagram illustrating an embodiment of a host used in a vehicle-dispatching system according to the present invention. As illustrated in FIG. 3, a host 40 is to be disposed in a vehicle 4 and in communication with the service center 10 through the wireless data transmission mechanism 19. The host 40 mainly includes a dispatching unit 401 and a navigating unit 402. The dispatching unit 401 is used for receiving the message from the service center 10 and decoding the location information included in the message. Once the driver is willing to accept the task, he triggers the dispatching unit 401 of the host 40 to send a task-accepting signal back to the service center 10. Then the dispatching unit 401 will receive a dispatching signal from the service center 10 if the vehicle is selected. In this embodiment, the action performed by the wireless data transmission mechanism 19 to transmit the data to the service center 10, for example, is GPRS of a mobile phone network. Of course, the emerging 3G mobile phone network, WiMAX, Wi-Fi, or other wireless networks may be alternative options. On the other hand, the navigating unit 402 exhibits the function of positioning mainly and built therein an electronic map 4020, a display 4021, and a speaker 4022. The navigating unit 402 may be integrated with the dispatching unit 401 and disposed in the same casing, or it may be disposed in a casing separate from the casing of the dispatching unit 401. The communication of the navigating unit 402 with the dispatching unit 401 may be accomplished through a signal transmission cable, wireless Bluetooth, or any other suitable short-distance wireless transmission means. The navigating unit 402 is designed to be able to receive and process the location information output from the dispatching unit 401, and use the display 4021 and the speaker 4022 to automatically reveal the route information in response to the vehicle-request message and the navigating information in response to the dispatching signal for the reference of the vehicle driver.

In the above embodiment, the location information provided by the service center 10 may include literal addresses of pick-up and/or drop-off locations or longitude and latitude coordinates corresponding to the addresses. When the hosts 40 of the vehicles 4 available for dispatching receive the location information, recommended routes starting from the current positions of respective vehicles 4 are shown on the display 4021 with the electronic maps 4020 in the hosts 40. In addition, the estimated distance of the recommended route and the estimated time to spend may also be revealed. In an embodiment, the above-mentioned route information may be calculated by the hosts 40. Alternatively, the route information may be provided by the service center 10.

Figure 4A:
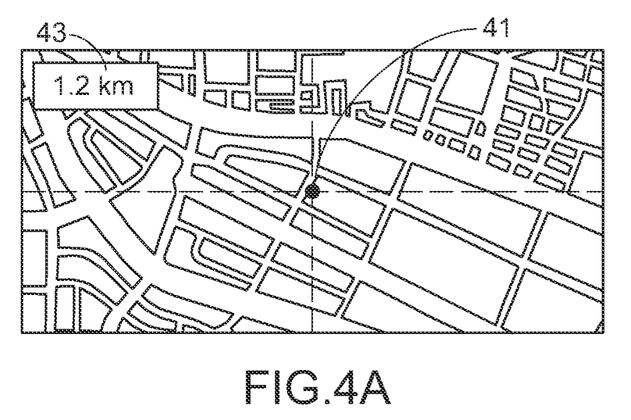
FIG. 4A~FIG. 4D are examples of maps shown on a navigating unit of the present invention to reveal route information.
Figure 4B:
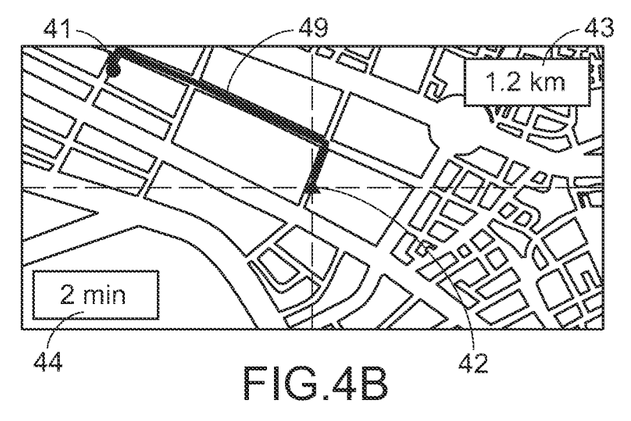
Figure 4C:
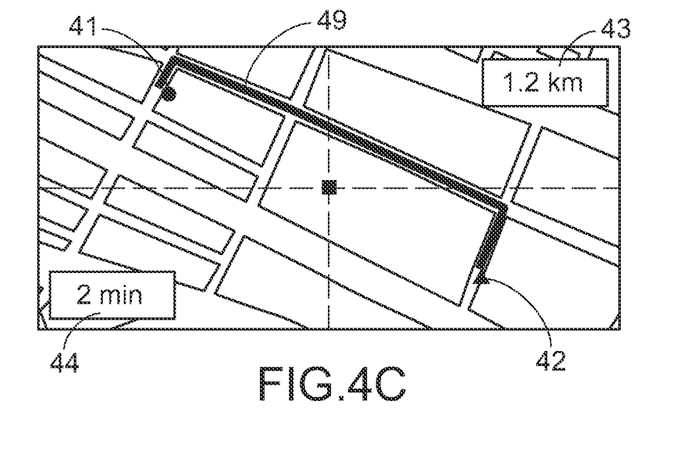
Figure 4D:
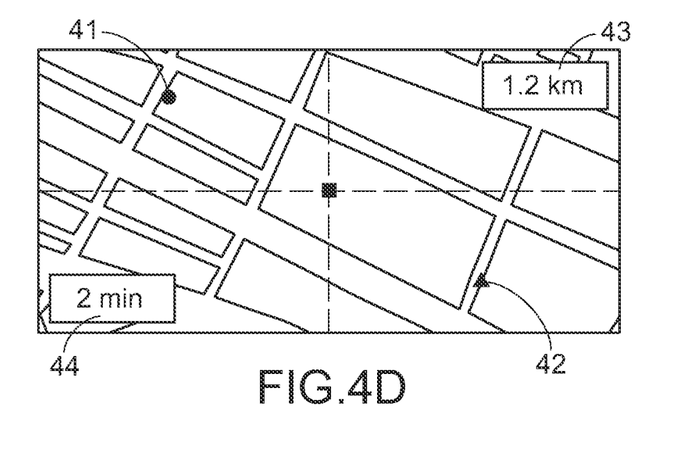

To obtain the best legibility for the driver, the resolution of the route map is adjusted to the optimal resolution while being capable of showing the current position of the vehicle and the pick-up and/or drop-off locations simultaneously on the display. Please refer to the examples as illustrated in FIGS. 4A, 4B, 4C and 4D. FIG. 4A illustrates a map marked with the pick-up location 41 and the estimated distance 43 from the current position of the vehicle to the pick-up location. Accordingly, the vehicle driver may decide whether to accept the task or not. FIG. 4B illustrates a route map marked with the current position 42 of the vehicle, the pick-up location 41 and a recommended route 49 connecting the current position 42 of the vehicle and the pick-up location 41. In addition, the estimated distance 43 and the estimated time 44 required for reaching the customer are also shown. In this example, the current position 42 of the vehicle is placed at the center of the display. FIG. 4C illustrates another route map marked with the same information as that in FIG. 4B, including the current position 42 of the vehicle, the pick-up location 41, the recommended route 49, the estimated distance 43 and the estimated time 44. In this example, a middle point of a hidden straight line connecting the current position 42 of the vehicle and the pick-up location 41 is placed at the center of the display. It is advantageous in locally enlarging the recommended route in the map to maximize resolution. The zoom ratio of the route map may be automatically adjusted to properly show the current position 42 of the vehicle and the pick-up location 41 on the display simultaneously. Of course, it is also feasible to show a map on the display, as shown in FIG. 4D, in which only the current position 42 of the vehicle and the pick-up location 41 are shown without scheduling any route. Alternatively, the route information may only include the estimated distance 43 and the estimated time to spend 44, starting from the current position 42 of the vehicle to the pick-up location 41, which may also be selectively revealed in an audio form through a speaker. For example, it is announced through the speaker, "Pick up at No. 100, Section 2, Bade Road, Taipei, about 1.2 kilometer and 2 minutes from here."

The above-mentioned estimated distance 43 and the estimated time to spend 44, starting from the current position 42 of the vehicle to the pick-up location 41, can be calculated by the navigating unit 402. Once the route information is conveyed to all the associated drivers with the transmission of the message from the service center 10, the one who is willing to accept the task just needs to trigger the button 4010 on the dispatching unit 401 in his host to send a task-accepting signal with the vehicle identification information (e.g. the registration number of the vehicle) back to the service center 10. Preferably, the service center 10 is also informed of the time estimated by the driver to arrive at the pick-up location. The driver may estimate the time according to the route information including the estimated distance 43 and the estimated time to spend 44 provided by the navigating unit 402 and the actual traffic flow. Besides, a scale (not shown) may be shown on the display 4021 to facilitate the estimation. Based on the returned information and other criteria, the service center 10 selects a vehicle 4 to pick up the passenger by issuing a dispatching signal to the host 40 of the selected vehicle 4. The criteria, for example, may include the order of receiving the task-accepting signals and the estimated distances or time to the pick-up location. The criteria may be evaluated with different weights.

The dispatching signal includes a navigating startup signal to trigger the host to reveal the navigating information automatically for the reference of the vehicle driver. The navigating information can be revealed in existing manners exhibited by the navigating unit of the host, e.g. navigating image, sound, or any other suitable forms. That is, once selected by the service center, the host of the vehicle will start the function of navigation without the manual triggering of the driver to assist the driver to readily arrive at the pick-up location. Furthermore, the dispatching signal may include the information of drop-off destination so that the host continues to perform navigation up to the arrival at the drop-off destination. In this way, there is no need at all for the driver to manually operate the navigating means, and the only thing the driver needs to do through the entire process is to trigger the host to send the task-accepting signal to the service center when the driver decides to accept the task. Accompanied with the output of the dispatching signal, the service center outputs a task-accepting notice to notify the customer. The notice can be a voice or text message and includes the vehicle identification information and the estimated time the customer needs to wait.

As described above, the vehicle-dispatching system, the vehicle-dispatching method, and the navigating device for use with the system and the method according the prevent invention do ameliorate the drawbacks of the prior art so as to provide an efficient dispatching flow. The system, method and device of the present invention may be widely applied to dispatch any forms of transportation tools for rent.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A vehicle-dispatching method for use with a service center and a plurality of vehicles, comprising steps of:
    issuing a message including a location information of a passenger to a plurality of hosts disposed in respective vehicles by the service center;
    revealing a route information associated with the location information and a current position of the vehicle by each host of the vehicle in response to the message, wherein the route information is calculated by the host;
    optionally issuing a task-accepting signal to the service center by one or more hosts to respond to the message;
    sending a dispatching signal to one of the hosts by the service center if the vehicle issues the task-accepting signal and is selected for dispatching by the service center; and
    triggering the host to automatically reveal a navigating information associated with the location information by the dispatching signal.

2. The vehicle-dispatching method according to claim 1 wherein the location information is acquired from the passenger via an information channel and transmitted to the host by a wireless data transmission mechanism, and includes information of a pick-up location and/or a drop-off destination.

3. The vehicle-dispatching method according to claim 1 wherein the information channel is an internet system or a telephone network, and the location information includes a literal address and/or a longitude and latitude coordinate corresponding to the address.

4. The vehicle-dispatching method according to claim 1 wherein the route information is triggered to be automatically revealed by the message, and includes a route map marked with the current position of the vehicle, a pick-up location and a recommended route provided by the host or the service center.

5. The vehicle-dispatching method according to claim 4, further comprising a step of automatically zooming the route map with a specific zoom ratio to show the current position of the vehicle and the pick-up location simultaneously.

6. The vehicle-dispatching method according to claim 1 wherein the route information includes an estimated distance and/or estimated time required to reach a pick-up location.

7. The vehicle-dispatching method according to claim 1 wherein the dispatching signal includes a navigating startup signal for triggering the host to automatically reveal the navigating information, and the navigating information includes navigation from the current position of the vehicle to a pick-up location and optional navigation from the pick-up location to a drop-off destination.

8. The vehicle-dispatching method according to claim 1 wherein the navigating information is revealed in an audible and/or visible form.

9. A vehicle-dispatching system, comprising:
    a service center issuing a message including a location information of a passenger when receiving a vehicle request from the passenger; and
    a plurality of hosts disposed in respective vehicles in communication with the service center, and revealing route information associated with the location information and current positions of the vehicles in response to the message, wherein the route information is calculated by the host, each of the hosts being optionally and manually triggered to send a task-accepting signal to the service center, the service center selecting one of the vehicles which sent the task-accepting signal, wherein the host of the selected vehicle receives a dispatching signal from the service center to automatically reveal a navigating information associated with the location information.

10. The vehicle-dispatching system according to claim 9 wherein the vehicle request is a vehicle-request phone call transmitted from a passenger to the service center through a telephone network or a vehicle online request transmitted from a passenger to the service center through the Internet, and the location information includes information of a pick-up location and/or a drop-off destination.

11. The vehicle-dispatching system according to claim 9 wherein each of the hosts comprises:
    a dispatching unit decoding the location information included in the message, sending the task-accepting signal to the service center in response to the triggering by a driver of the vehicle, and receiving the dispatching signal from the service center if the vehicle corresponding to the host is selected by the service center; and
    a navigating unit in communication with the dispatching unit, receiving the location information from the dispatching unit and revealing the route information in response to the message, and revealing the navigating information in response to the dispatching signal.

12. The vehicle-dispatching system according claim 11 wherein the navigating unit includes an electronic map and a display for showing a route map marked with the current position of the vehicle, a pick-up location and a recommended route provided by the host or the service center.

13. The vehicle dispatching system according to claim 12 wherein a zoom ration of the route map is automatically adjusted to show the current position of the vehicle and the pick-up location simultaneously on the display.

14. The vehicle-dispatching system according to claim 11 wherein the navigating unit includes an electronic map for calculating an estimated distance and/or estimated time required to reach a pick-up location from the current position of the vehicle, and a speaker for announcing the estimated distance and/or estimated time.

15. The vehicle-dispatching system according to claim 9 wherein the dispatching signal includes a navigating startup signal for triggering the host of the selected vehicle to automatically reveal the navigating information.

16. The vehicle-dispatching system according to claim 9 wherein the location information is acquired from the passenger via an internet system or a telephone network and transmitted to the hosts by a wireless data transmission mechanism, and includes information of a pick-up location as a literal address and/or a longitude and latitude coordinate corresponding to the address.

17. A navigating device for use in a vehicle to communicate with a service center that selects one of a plurality of navigating devices that communicate with the service center, comprising:
    a dispatching unit decoding a location information of a passenger included in a message issued by the service center when the passenger sends a vehicle request to the service center, sending a task-accepting signal to the service center in response to the triggering by a driver of the vehicle, and receiving a dispatching signal from the service center when the vehicle is selected for dispatching by the service center from among the plurality of navigating devices sending the task-accepting signal to the service center; and
    a navigating unit in communication with the dispatching unit, receiving the location information from the dispatching unit and automatically revealing a route information associated with the location information and a current position of the vehicle in response to the message, and automatically revealing a navigating information including navigation from the current position of the vehicle to a pick-up location in response to the dispatching signal, wherein the navigating unit includes:
    an electronic map for calculating an estimated distance and/or estimated time required to reach the pick-up location from the current position of the vehicle, and a display for showing a route map marked with the current position of the vehicle, the pick-up location and a recommended route.

18. The navigating device according to claim 17 wherein the navigating unit includes an electronic map for calculating an estimated distance and/or estimated time required to reach the pick-up location from the current position of the vehicle, and a speaker for announcing the estimated distance and/or estimated time.

19. The navigating device according to claim 17 wherein the navigating unit is integrated with the dispatching unit in the same casing or disposed in a separate casing from the dispatching unit.

* * * * *